United States Patent

Sanders

[15] 3,648,285
[45] Mar. 7, 1972

[54] AIRCRAFT ELECTRONIC LANDING RESPONSER SYSTEM USING SCANNING PENCIL BEAM GROUND ANTENNA

[72] Inventor: Lon L. Sanders, Palos Verdes Peninsula, Calif.

[73] Assignee: International Telephone and Telegraph Corporation, New York, N.Y.

[22] Filed: Mar. 30, 1970

[21] Appl. No.: 23,757

[52] U.S. Cl..................343/6.5 R, 343/5 LS, 343/11 R, 343/16 R, 343/17.2 R, 343/106 R
[51] Int. Cl............................................G01s 9/56
[58] Field of Search................343/5 LS, 6.5 R, 11 R, 16 R, 343/172. R, 106 R

[56] References Cited

UNITED STATES PATENTS

| 3,266,038 | 8/1966 | Milne et al. | 343/11 R X |
| 3,302,201 | 1/1967 | Vladimir et al. | 343/106 R |
| 3,327,309 | 6/1967 | Shulman et al. | 343/16 R UX |
| 3,349,399 | 10/1967 | Bohm | 343/106 R |

Primary Examiner—T. H. Tubbesing
Attorney—C. Cornell Remsen, Jr., Walter J. Baum, Paul W. Hemminger, Charles L. Johnson, Jr. and Thomas E. Kristofferson

[57] ABSTRACT

An electronic approach and landing aid system involving the use of an airborne interrogator and a ground station having a rapid elevation frequency scan and a somewhat slower azimuth phase scan of a planar array. Each interrogating pulse produces a chirp pulse at the ground station and each chirp pulse produces one complete elevation scan cycle of the pencil beam formed by the planar array. Elevation angle data is air derived from the frequency of the pencil beam energy as it passes across the aircraft, and range is determined in proportion to ground chirp time between interrogating pulses and corresponding replies. Azimuth position of the ground antenna pencil beam is separately supplied through an independent modulation which is correspondingly decoded in the air.

10 Claims, 1 Drawing Figure

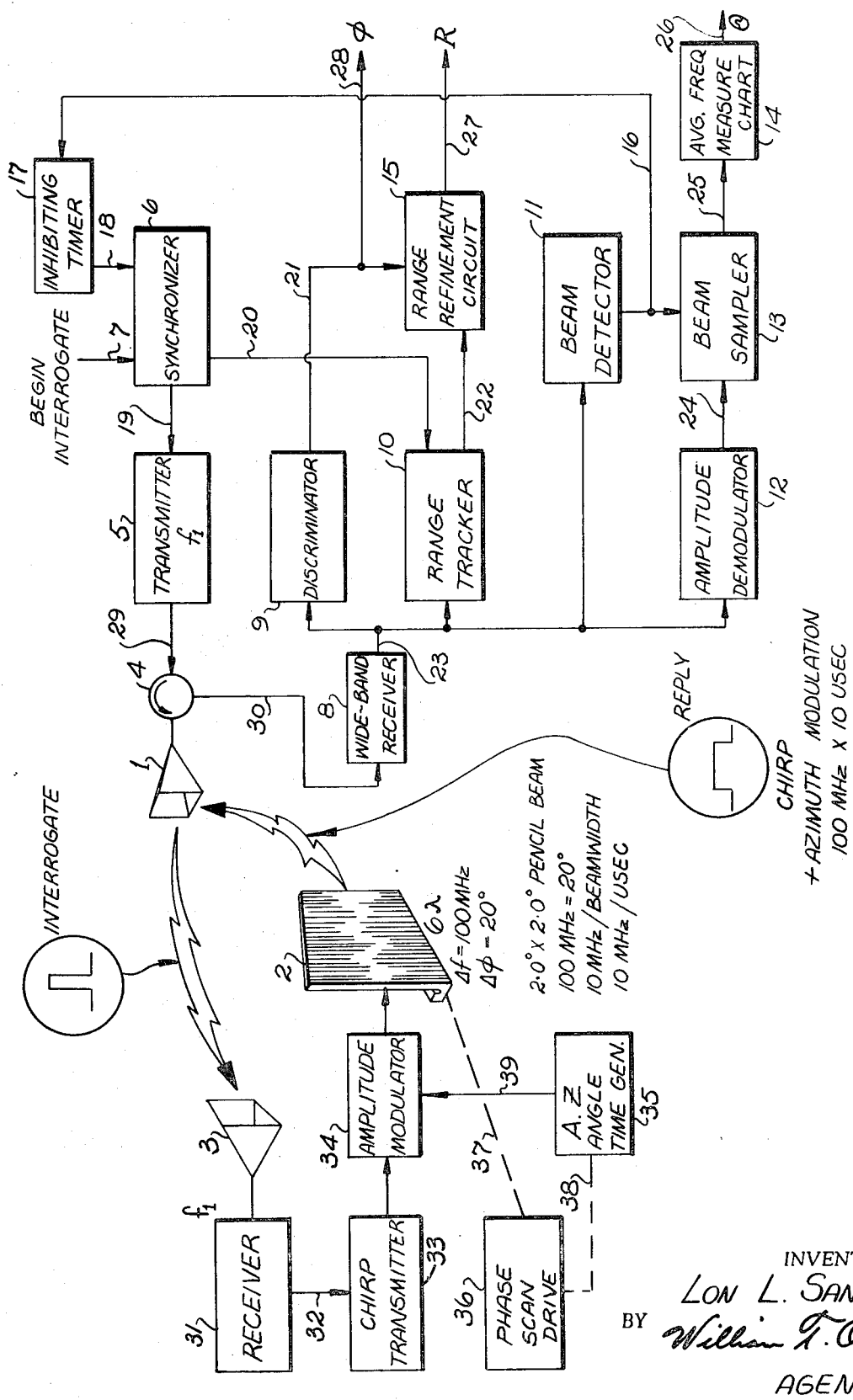

AIRCRAFT ELECTRONIC LANDING RESPONSER SYSTEM USING SCANNING PENCIL BEAM GROUND ANTENNA

BACKGROUND OF THE INVENTION

1. Field of the Invention

The invention relates broadly to air navigation systems and more particularly to instrument landing systems for obtaining air derived range and angle information.

2. Description of the Prior Art

In the prior art there have been many developments to provide navigational guidance to aircraft. Such systems have been produced for long range or en route navigation (LORAN, OMNIRANGE, RADAR in various forms, etc.), as well as for the relatively more critical problem of providing navigational assistance under low visibility instrument conditions at the time of landing. The urgency of the landing situation has long been recognized as a problem of very high priority since it critically affects safety and continuity of operation in civil and military aviation.

Existing systems for landing include ILS, GCA, automatic GCA, and various other active ground and airborne systems. A comprehensive reference for reader background which describes most of the better known currently used prior art navigational aids for aviation is the textbook "Electronic Avigation Engineering" by P. C. Sandretto, published in 1958 by International Telephone and Telegraph Corporation, New York, N.Y.

One embodiment of the so called GCA "talk down" system is described in U.S. Pat. No. 2,975,413. Its automatic track-while-scan form is typically described in U.S. Pat. No. 2,980,902.

Various ways have been proposed for using radar for specialized landing assist, however, the relative complication and operating personnel requirements can be seriously disadvantageous in the case of the remote or newly established landing area for aircraft of the VTOL classes. Landing aids for VTOL aircraft in all-weather conditions are of special interest in certain military situations and are attracting increasing interest in other situations.

For the type of device with which the present invention is concerned, a few specific applications are as follows:

a. A landing aid for VTOL fighter-bomber aircraft for use at remote dispersal air fields or parking pads.
b. A landing aid for soft helicopter operations in remote areas previously accessible only by parachute.
c. A landing aid for civil helicopter and VTOL airways operations for use in urban areas.
d. A landing strip aid for forward airfields or cargo delivery air strips.
e. A landing aid which augments an ILS system or a GCA system at larger, well improved airports.

The above areas of need represent existing situations where there is a high premium on all-weather operations and a large number of potential user aircraft. None of the above requirements can be effectively satisfied by the existing ILS or GCA type systems.

The disadvantages of the said prior art systems concern data rates, angles of coverage, power economy, ability to operate at remote ground stations unattended, and lack of ground station radiation security.

SUMMARY

In view of the applications for devices of a class of the present invention, and in consideration of the disadvantages of the prior art devices, it may be said that the general object of the present invention was the implementation of a landing aid system providing for air-derived angle and range information, which is especially adapted to the VTOL type of aircraft.

The present invention provides for relatively simple airborne equipment working in cooperation with a ground station in the vicinity of a landing area. The airborne equipment contains both transmitting and receiving functions operating over the same wide band antenna and circulator feed systems for simultaneous transmission and reception. In the transmitting mode, the airborne equipment transmits a relatively short interrogating pulse at a relatively low repetition frequency (approximately 250 Hz.). The radio frequencies involved in transmitting these interrogation pulses is removed by at least a nominal separation from the band of frequencies to be retransmitted from the ground station.

At the said ground station, the heart of the system comprises a two-dimensional scanning antenna which forms a relatively sharp pencil beam. The said pencil beam is positioned in a first angular coordinate (elevation typically) by means of frequency scanning, and in a second angular coordinate of scan (typically azimuth) by an independent phase scan. In response to each interrogating pulse, a receiver-transmitter combination at the ground station generates a chirp (frequency modulated) pulse of duration and frequency deviation such as to cause one complete cycle of elevation scan in the said ground antenna for each applied chirp pulse. The azimuth scan control means are preferably operated continuously and whenever the said ground antenna is energized in response to the aforesaid airborne interrogation pulses, the said pencil beam is formed at an azimuth corresponding to the instantaneous condition of this azimuth control. A typical frequency phase planar array and scanning system suitable for the ground is described in U.S. Pat. No. 3,398,365.

From the foregoing, it will be understood that the passage of the said pencil beam over the interrogating aircraft will be delayed some fraction of the time of an azimuth scan. This delay, however, is not significant in terms of aircraft movement, since the azimuth scan would typically be on the order of five cycles per second.

Upon passage of the pencil beam over the interrogating aircraft, the instantaneous chirp frequency or rather band of frequencies corresponding to the elevation width of the pencil beam would be received and detected in a discriminator circuit having an output analog versus frequency characteristics which is the same function as that of the elevation beam pointing position versus frequency of excitation at the ground antenna.

Range is air derived by tracking the reply chirp pulses. The delay of each chirp pulse following a corresponding interrogation pulse is proportional to two-way radiation time and therefore to range, as is well understood. In the present system, a correction of the range analog generated by such a range tracker is necessary, however, since the beginning of the chirp pulse always corresponds to one extreme of the elevation scan of the ground antenna. Typically, the chirp pulse is 10 microseconds in duration and accordingly, without correction, the range analog could be in error by as much as 10 microseconds which would produce an error of an appreciable fraction of a mile. Since the said error will be seen to be a function of elevation angle, the opportunity is taken to subtract a suitably scaled elevation analog signal from the uncorrected range analog. The result is a greatly improved range analog accuracy. If the ground antenna elevation scan beginning point is at the lowest elevation angle, the importance of the range analog correction just described will be seen to be diminished as the aircraft approaches its landing area and range and elevation angle both approach zero. Under these circumstances the passage of a pencil beam over an approaching aircraft occurs early in the chirp pulse (low elevation angle).

At the ground station, an azimuth angle tone generator is coupled to the azimuth scan control means in a manner so as to vary the amplitude of a constant signal which is then superimposed through an amplitude modulator on the chirp pulses to be transmitted from the ground station. This process will be described in more detail as this specification proceeds. The use of a low frequency audio tone in the 50 to 100 cycle region for the basic signal variable amplitude signal in this azimuth scan angle analog scheme will be described. It will be readily realized, however, that other modulation schemes could be employed in this connection and, in fact, the said azimuth angle analog could be transmitted over the separate antenna and at the separate frequencies over which the airborne interrogations are received.

The azimuth data transmission feature of the overall combination is less fundamental to the novel concepts than is the elevation angle determination structure.

The decoding of the azimuth angle analog information in the airborne equipment simply involves the use of an amplitude demodulator which includes low pass filtering to eliminate any frequency components resulting from the system repetition frequency and extraneous higher frequencies. The output of such a demodulator contains the basic azimuth angle information, however, its quality and utility are improved if the output thereof is gated by a signal having an on-time equal to the time of the pencil beam passage over the aircraft. Such a gating signal is derived by box-car detection of the airborne receiver output. This combination may be referred to as angle gating of the azimuth amplitude demodulator output. Thereafter an average frequency measuring circuit, which is itself a frequency discriminator, produces an azimuth angle analog.

Since radiation security from the ground station requires that nonuseable transmission be minimized, the said beam detector gate is used to control an inhibiting timer which operates to disable the source of airborne interrogation pulses at all times other than during azimuth alignment of the pencil beam of the ground antenna with the interrogating aircraft. An inhibiting timer effectively "learns" when to expect the next azimuth alignment of the pencil beam and enables operation of the airborne interrogating circuits at those times.

The details of circuits and elements required to implement the system of the present invention will be described as this specification proceeds.

BRIEF DESCRIPTION OF THE DRAWINGS

The single FIGURE is a structural and functional block diagram illustrating the air and ground elements of a complete system according to the invention.

DESCRIPTION OF THE PREFERRED EMBODIMENT

Referring now to the FIGURE a complete structural and functional block diagram of the system of the present invention is shown. The antenna 1 depicted as a horn-type radiator, and all components to the right of it on the FIGURE, are to be understood to comprise the airborne components of the system. On the other hand, antenna 2 and all of the components to the left of it are to be understood to be located at the ground station adjacent to the landing area in connection with which the present system is intended to function.

The system to be described is essentially a two-way radiating system involving interrogation from the air to a ground station. The said interrogation pulses from the air are answered on a one for one basis by a relatively long chirped pulse (frequency modulated) ground transmission. Of the three antennas envisioned in the present system, the airborne antenna 1 and the ground antenna 3 are not essentially directive, whereas the antenna 2 is a planar array capable of pointing control of a pencil beam in two coordinates. An antenna and scanning system entirely suitable for this application is described in U.S. Pat. No. 3,438,035. That antenna is a planar array adapted for simultaneous frequency and phase scanning. The frequency scan is capable of changing the beam pointing angle very rapidly since it is essentially inertialess. The phase scan accomplished in the orthogonal plane is, on the other hand, accomplished at a lower rate. The mechanically actuated form of phase scan illustrated in the said U.S. Pat. No. 3,438,035 is sufficiently fast for providing the four or five cycle per second azimuth scan contemplated in the system of the present invention. The faster acting electronically controlled phase shifting embodiment shown in the same reference may be used but is not required.

The present system contains the required instrumentation for the air derivation of azimuth and elevation angular data as well as range. Azimuth and elevation angle data is derived with respect to the ground station, as is usually the case with electronic landing aids. In the description to follow, first and second angular coordinates have been referred to for the sake of generality. Normally the said first and second angular coordinates would refer to the elevation angle and the azimuth angle (bearing) respectively.

In order to meet operational requirements for VTOL landing, the ground station antenna 2 would typically be designed to frequency scan in the elevation plane over a total 20° sector. A 100 MHz frequency change or chirp of the transmitted pulse from 2 could be expected to accomplish the aforementioned 20° range of beam pointing angles, in a system operating basically at a transmitted frequency somewhere in the region of 5,000 to 15,000 MHz. The duration of the transmitted chirp pulse from the ground antenna 2 is 10 microseconds in one practical embodiment, that is, the 100 MHz chirp or frequency deviation occurs within a 10 microsecond pulse.

The planar array 2 is substantially symmetrical insofar as number of radiators is concerned and is designed to produce a pencil beam of approximately 2° at half power points, in each of the two orthogonal planes of scan.

Although it has been indicated that antennas 1 and 3 are substantially nondirectional, they are illustrated as horn antennas which obviously have some directivity. Those directivity characteristics are not necessary to the functioning of the present system, however, some directivity is desirable for purposes of radiofrequency power economy and to minimize interference problems. It is a requirement that ground antenna 3 provide a sufficiently broad radiation pattern to cover the said 20° elevation scan sector through which the planar array 2 functions, and in addition an arbitrary azimuth sector (up to 45° typically). Antenna 1, which radiates the interrogation pulses toward the said ground station, needs to have a sufficiently broad radiation pattern to ensure that the interrogation pulses are received at 3 for all aircraft positions within the approach sector, allowing also for nominal aircraft attitude deviations.

The airborne synchronizer 6 and transmitter 5 cooperate to energize the antenna 1 with the relatively short duration interrogation pulses (typically 1 or 2 microseconds in duration) at a relatively low pulse repetition frequency of 250 Hz. A circulator 4 is to be understood to be a straightforward prior art three-part device of the ferrite or similar type. It functions to pass the said interrogation pulses via lead 29 to antenna 1.

In passing pulse energy from the transmitter 5 to the antenna 1 the circulator 4 diverts substantially no energy into the lead 30. Conversely, when receiving chirp pulse energy from the ground station the circulator 4 operates to pass the said received energy to lead 30 and thence to the wide band receiver 8 without substantial diversion into the lead 29.

Before proceeding with functional descriptions it is desirable to discuss the details of the ground station equipment more fully. It will be assumed that the mechanical phase scan version in the aforementioned U.S. Pat. No. 3,438,035 is employed in connection with the ground station antenna 2 and its associated hardware. The phase scan drive 36 is mechanically linked by a representation 37 and it is presumed that the mechanical action which produces the phase scan operates continuously whenever the ground station is in a condition receptive to interrogation from the airborne equipment. This continuous operation of the mechanical phase scan structure of the antenna 2 does not mean that any transmission is being radiated from the antenna 2. The continuous operation of these mechanical components is a convenience and simplification rather than a functional necessity.

An azimuth angle tone generator 35 is linked by a connection 38 to the said mechanical drive 36. The tone generator 35 operates typically in a band from 50 to 100 Hz. and the frequency it produces and applies via lead 39 to the amplitude modulator 34 varies in manner directly related or analogous to the pencil beam radiation angle from the antenna 2 in the azimuth or second beam angle coordinate. Analog data takeoffs of this particular type are well known in the prior art and their instrumentation is readily undertaken by the skilled practitioner in this art.

Thus, it will be seen that a continuous azimuth-representing signal is provided to the amplitude modulator 34 via lead 39 and this signal is available as an amplitude modulation to be superimposed on the signal from the chirp transmitter 33 whenever the latter is brought into operation. Referring now to the synchronizer 6 which functions as a timing unit for the airborne components, an "initiate" signal applied at 7 begins the cycle of interrogation and operation of the system. This signal at 7 is merely a switching or enabling function and may simply be thought of as an operator on-off control. The inhibiting time of 17 which will be described in greater detail later is not operative at the time of initiating the interrogation pulses.

The said interrogation pulses once received by the antenna 3 in the receiver 31 at the ground station, are provided via lead 32 as synchronizing pulses to the chirp transmitter 33. The signal on 32 may be thought of as a straightforward video pulse at the said interrogation PRF on the order of 250 Hz. The chirp transmitter 33 is to be understood to contain the necessary frequency modulation circuits to generate the individual 10 microsecond chirp transmitter output pulses at the same pulse rate repetition frequency as received from the aircraft. These chirp pulses are parametered to correspond with the elevation angle vs. frequency characteristic of the antenna 2. That is, in the 10 microsecond duration of each chirp pulse the frequency modulation excursion is 100 MHz, which produces a 20° beam pointing angle change (scan) in the elevation or first angular coordinate. The tone modulation corresponding to the azimuth beam pointing position being continually present on lead 39, the amplitude modulator 34 superimposes a corresponding azimuth indicating signal on the chirp pulse series from 33. In this way the transmitted information from the antenna 2 provides the basic information from which both elevation and azimuth angles can be air derived.

It will be realized, in view of the relatively short duration of the chirp pulses, that the dwell or passover time of the pencil beam from antenna 2 at any particular aircraft angle is only 1 microsecond. The fact follows from the total chirp pulse duration of 10 microseconds and the ratio of the elevation pencil beam width to the total elevation scan.

Once enabled, the interrogation pulses are continuously transmitted and chirp pulse replies are transmitted immediately in response to the interrogations. However, these are not received at the antenna 1 unless and until the continuously scanning azimuth beam pointing angle arrives at the angle corresponding to the interrogating aircraft. Once this condition is satisfied however, the said 1 microsecond bursts of chirped energy (containing a 10 MHz segment of the total chirp) are received. Since the azimuth scan is relatively slow and the azimuth beam width of the antenna 2 is on the order of 2°, there will be several elevation chirp cycles during the time that the pencil beam can illuminate the antenna 1 during each azimuth scan cycle.

The pulses received at 1, after passing through the circulator 4, travel via lead 30 through the wide band receiver 8 and thence to the discriminator 9. This discriminator 9 is calibrated to provide an analog signal output at 21 which is the same function of frequency at 23 as the elevation beam angle versus frequency function of the antenna 2. The discriminator 9 is to be understood to contain the necessary smoothing and integrating circuitry so that the said elevation angle analog signal at 21 is based on the average chirp frequency within the 1 microsecond received pulses as aforesaid. This analog signal on 21 is provided to an elevation angle analog output terminal 28 and also to a range refinement circuit which will be described in more detail in connection with the range determining circuits.

The envelope of the signal at 23 will be seen to resemble a typical radar echo pulse. As such it is readily handled by time delayed measuring circuits for the determination of range. It will be noted that a synchronizing pulse on lead 20 from the synchronizer 6 is supplied to the range tracker 10 marking the beginning of each interrogation pulse. So long as there are no appreciable time delays introduced in the ground station the range from the aircraft to the said ground station is directly proportional to the round trip radiation transmission time. That is, the time from the beginning of a selected interrogation pulse until the corresponding chirp pulse is received at the aircraft. The range tracker 10 as such is readily constructed by one skilled in these arts. A relatively elaborate circuit such as shown for range tracking in U.S. Pat. No. 2,795,781 could provide this function, or a simple technique such as a ramp reference voltage generator with sample and hold circuits could provide the function of block 10. In the latter approach, the synchronizing pulse supplied by a lead 20 would be used to initiate a linear sawtooth or ramp voltage having a peak voltage and duration corresponding to the maximum anticipated range of the system. The signal input from 23 would then be used as a sampling pulse whereby the said sawtooth amplitude is sampled during the time of occurrence of the signal at 23. Suitable smoothing and holding circuits can provide a voltage analog of range at 22.

Upon careful consideration of the aforementioned range determination function, it will be realized that correction of the analog signal on 22 is necessary because an additional delay is added to the round trip transmission time proportional to the elevation angle. This error can be as much as the entire chirp pulse, i.e., 10 microseconds or a substantial fraction of a mile. In view of this effect, the output of the elevation angle discriminator 9 at 21 is supplied to the range refinement circuit 15. This circuit is simply an appropriately scaled algebraically additive mixer in which the signals at 22 are reduced by a factor proportional to the said range analog on 21. Stated otherwise, a factor proportional to the elevation angle analog signal is subtracted from the range analog in order to produce a corrected range analog output at 27.

It will be noted that the output of the wide band receiver at 23 is also applied to a beam detector 11 and an amplitude demodulator 12 in parallel. The said beam detector 11 is simply a circuit for generating a square wave which is representative of the angular envelope of the beam dwell or passby time during elevation scan. The signal at 23 is first subjected to a threshold circuit in 11 in order to eliminate much of the noise, sidelobes and other relatively low extraneous amplitude signals. Accordingly, the output from the beam detector 11 at 16 is a gate on the order of the 1 microsecond in duration appearing at the repetition frequency of the system. Using this signal 16 as a gate, a beam sampler or electronic switch 13 eliminates from the output 24 of the amplitude demodulator 12 all signals occurring at times outside the said gate. Thus the signal on lead 25 may be thought of as being angle gated and containing essentially the same band of chirp frequencies as were applied to the discriminator 9. An average frequency measurement circuit 14 (which is in effect another discriminator operating in a much lower frequency range) then provides an output 26 which is an analog of the azimuth angular position of the aircraft with respect to the ground station.

From the point of view of radiation security, particularly in hostile environments, it is desirable that the ground station not transmit for a longer time than necessary or over angles other than those corresponding to an aircraft on approach. Since there is essentially random access to the ground station, the azimuth pointing angle of the antenna 2 may be any angle within its full azimuth scan range at the time of reception of the first interrogation pulse from the air. Since chirp scan replies are not received by the aircraft until such time as the azimuth beam pointing angle reaches the bearing of the corresponding aircraft, some extraneous ground transmission is inevitable. However, since the scan period of the ground antenna 2 in azimuth is known in the aircraft and is constant, the opportunity of timing the synchronizer to interrogate only during those times when a response can be received in the aircraft suggests itself. Thus a simple timing function applied to the synchronizer 6 to keep it from generating interrogating synchronizing pulses except during the beam detector gate on 16 is possible. The only additional requirement is for phase locking the inhibiting timer 17 to the said gate. Over several cycles of azimuth scan, at the most, the inhibiting timer 17 can "learn" the correct phase for its operation. A self-timing gate which generates a blanking or inhibiting pulse having a duration equal to the time between azimuth scan passes over an aircraft can automatically enable the synchronizer 6 via a signal on 18 in anticipation of each succeeding azimuth signal azimuth beam pass. The circuit elements required for instrumentation of the block 17 will be evident to those skilled in this art from the foregoing requirements and functional description.

It will be realized that the chirp pulse time as a percentage of the interpulse period of the interrogation pulses is quite small, i.e., the airborne equipment operates on a low duty cycle. Thus airborne power economy is relatively good; and the combination of the low duty cycle operation required of the ground station and in view of the exclusiveness of the transmissions of the ground station on an azimuth angular basis, it will be realized that a number of aircraft on different approach paths in azimuth and in elevation may be simultaneously accommodated by the present equipment.

Obviously, since the individual circuit block functions are of themselves relatively simple, a number of alternative instrumentations are possible. Also, certain system modifications within the scope of the present invention are possible. It will be evident that the azimuth angle analog signal information transmitted from the ground could also be transmitted over the antenna 3 by converting the amplitude modulator 34 into a small amplitude modulator-transmitter, feeding its output into a circulator inserted in the path between antenna 3 and receiver 31. Normally the frequency band used for transmissions between antennas 1 and 3 would be separated from the range of useful frequencies transmitted by the antenna 2, and accordingly such an expedient would not introduce any additional interference complications.

It will also be realized that pulse repetition frequencies, chirp pulse duration and frequency deviation factors are typical and exemplary only, as is the type of modulation employed to transmit the azimuth angle data.

It is not intended that the scope of the present invention should be limited by the description or the drawing, these being typical and illustrative only.

What is claimed is:

1. An air navigation system particularly adapted for instrument landing of VTOL aircraft, comprising the combination of:
   a ground station located adjacent to a landing area;
   airborne transmitting means including a synchronizer for generating and radiating a series of interrogation pulses toward said ground station, at a relatively low pulse repetition frequency;
   means for receiving said interrogation pulses at said ground station and for generating a chirp transmitter pulse for each of said interrogation pulses received;
   ground antenna means for radiating said chirp pulses at an angle in a first angular coordinate which corresponds continuously with the instantaneous chirp frequency at any time during said chirp pulse, thereby to produce a chirp scanned beam in said first angular coordinate from said ground antenna;
   airborne receiving means carried by said aircraft for receiving energy from said ground station as said scanning beam passes over said aircraft;
   discriminator means responsive to the output of said airborne receiving means, said discriminator being calibrated to provide an output in accordance with the same function of frequency as the angle of radiation-versus-frequency function of said ground antenna, whereby said discrimination output is the analog of the beam pointing angle of said ground antenna in said first angular coordinate.

2. The invention set forth in claim 1 including range tracking means responsive to the output of said receiving means and said synchronizer for producing a range approximation signal as a function of the time between an interrogation pulse and reception of said energy when said ground antenna beam crosses said aircraft in said first angular coordinate scan.

3. The invention set forth in claim 2 including a range refinement circuit responsive to said range approximation signal and said discriminator output for subtracting a factor from said range approximation signal proportional to the delay of the input signal to said range tracker from the leading edge of said chirp pulse, thereby to produce a refined range signal having a value substantially proportional to the signal transit time between said aircraft and said ground station.

4. The invention set forth in claim 3, further defined in that said ground antenna means includes at least a linear array for forming a beam narrow in the plane of said first angular coordinate, said array including a plurality of elements fed from a transmission line presenting a predetermined extended path between adjacent elements of said array to produce beam pointing in said plane of said first angular coordinate which is a predetermined function of frequency.

5. The invention set forth in claim 3 in which said ground antenna means comprises a planar array for forming a pencil beam; additional scanning means are included for simultaneously and independently scanning said pencil beam in a second angular coordinate at an angle with respect to said first angular coordinate; means operatively associated with said additional scanning means and said means for generating said transmitter chirp pulse, for introducing a separate and independent modulation on said chirp pulses to represent the position of said pencil beam within said second angular coordinate; and additional airborne angle detection means for decoding said separate modulation thereby to generate a signal representative of the aircraft position in said second angular coordinate.

6. The invention set forth in claim 5 in which said separate modulation is defined as being amplitude modulation, and said additional airborne angle detection means includes an amplitude demodulator having an output representative of said aircraft position in said second angular coordinate.

7. The invention defined in claim 5 in which said planar array consists of a plurality of columns of radiators, said columns extending within the plane of said chirp scanned beam and said columns being simultaneously supplied said chirp pulses to produce said beam scan in the plane of said first angular coordinate; and said additional scanning means includes means for varying the phase of excitation of said columns differentially and progressively throughout all of said columns in said planar array.

8. The invention defined in claim 7 in which said first scanning coordinate is defined as that of elevation angle measurement from said ground station, and said second angular coordinate is defined as that of azimuth angle measurement from said ground station.

9. The invention set forth in claim 7 including means for generating an angle gate during the time said pencil beam scans over said aircraft and interrogation limiting means for applying said angle gate to said airborne transmitting means to enable the generation of said interrogation pulses substantially only during said angle gate, said interrogation limiting means including timing means operative after an initial period of interrogation equal to at least one scan cycle of said additional scanning means and adapted to inhibit transmission of said interrogating pulses substantially during the time said pencil beam is not pointing toward said aircraft.

10. The invention set forth in claim 6 further defined in that said additional airborne angle detection means includes a sampling circuit responsive to the output of said amplitude demodulator; means are included for enabling said sampling circuit during passage of said beam at said aircraft; and an average frequency measuring circuit responsive to the output of said sampling circuit is also included for producing said output signal which is representative of said aircraft position in said second angular coordinate.

* * * * *